United States Patent
Cho

(10) Patent No.: US 11,165,124 B2
(45) Date of Patent: Nov. 2, 2021

(54) BATTERY PACK

(71) Applicant: SAMSUNG SDI CO., LTD., Yongin-si (KR)

(72) Inventor: Mansik Cho, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 294 days.

(21) Appl. No.: 16/319,164

(22) PCT Filed: Jun. 23, 2017

(86) PCT No.: PCT/KR2017/006672
§ 371 (c)(1),
(2) Date: Jan. 18, 2019

(87) PCT Pub. No.: WO2018/016755
PCT Pub. Date: Jan. 25, 2018

(65) Prior Publication Data
US 2019/0267601 A1    Aug. 29, 2019

(30) Foreign Application Priority Data

Jul. 21, 2016 (KR) .................. 10-2016-0092904

(51) Int. Cl.
*H01M 50/531* (2021.01)
*H01M 10/42* (2006.01)
*H01M 50/20* (2021.01)

(52) U.S. Cl.
CPC ......... *H01M 50/531* (2021.01); *H01M 10/42* (2013.01); *H01M 10/425* (2013.01);
(Continued)

(58) Field of Classification Search
CPC ........ H01M 2/26; H01M 2/10; H01M 2/1077; H01M 10/42; H01M 10/425
See application file for complete search history.

(56) References Cited

U.S. PATENT DOCUMENTS 8,852,790 B2   10/2014 Moom
9,017,855 B2    4/2015 Park et al.
(Continued)

FOREIGN PATENT DOCUMENTS

CN         101517782 A    8/2009
KR   10-2008-0027505 A    3/2008
(Continued)

OTHER PUBLICATIONS

EPO Extended Search Report dated Feb. 17, 2020, for corresponding European Patent Application No. 17831228.6 (8 pages).
(Continued)

*Primary Examiner* — Helen Oi K Conley
(74) *Attorney, Agent, or Firm* — Lewis Roca Rothgerber Christie LLP

(57) ABSTRACT

A battery pack of the present disclosure includes: a holder case accommodating a plurality of battery cells, each of the battery cells including an electrode portion on each end thereof; a protective circuit module mounted on an outer side of the holder case; at least one first lead tab including a fixing portion and a fastening portion, the fixing portion extending from a region of the protective circuit module facing the holder case toward the holder case, the fastening portion being bent from the fixing portion in a direction parallel to the holder case and extending toward the electrode portion of the battery cell; and a second lead tab electrically connected to the electrode portion of the battery cell and placed at a position corresponding to the fastening portion of the first lead tab of the protective circuit module.

8 Claims, 5 Drawing Sheets

(52) U.S. Cl.
CPC .... *H01M 50/20* (2021.01); *H01M 2010/4271* (2013.01); *H01M 2220/20* (2013.01)

(56) References Cited

U.S. PATENT DOCUMENTS

| | | | |
|---|---|---|---|
| 9,040,183 | B2 | 5/2015 | Sung et al. |
| 10,003,105 | B2 | 6/2018 | Cho et al. |
| 2007/0160878 | A1 | 7/2007 | Kim et al. |
| 2010/0255355 | A1 | 10/2010 | Park et al. |
| 2011/0039129 | A1 | 2/2011 | Lee et al. |
| 2011/0097619 | A1* | 4/2011 | Park .................. H01M 2/105 429/159 |
| 2011/0273807 | A1 | 11/2011 | Kim et al. |
| 2013/0052487 | A1 | 2/2013 | Park |
| 2014/0004392 | A1 | 1/2014 | Sung et al. |

FOREIGN PATENT DOCUMENTS

| | | |
|---|---|---|
| KR | 10-2010-0082200 A | 7/2010 |
| KR | 10-2010-0082530 A | 7/2010 |
| KR | 10-2012-0137019 A | 12/2012 |
| KR | 10-2013-0024752 A | 3/2013 |
| KR | 10-1430901 B1 | 8/2014 |
| KR | 10-2015-0117920 A | 10/2015 |

OTHER PUBLICATIONS

International Search Report of corresponding PCT/KR2017/006672, dated Nov. 9, 2017 with English translation, 5 pages.
Written Opinion of the International Searching Authority, corresponding to PCT/KR2017/006672, dated Nov. 9, 2017 with English translation, 7 pages.
International Preliminary Report on Patentability of corresponding PCT/KR2017/006672, dated Jan. 22, 2019 with English translation, 4 pages.
Korean Office Action dated Jun. 9, 2020, for corresponding Korean Patent Application No. 10-2016-0092904 (3 pages).
Chinese Office Action from corresponding Chinese Patent Application No. 201780045105.0, Chinese Office Action dated Jan. 5, 2021 (7 pgs.).
English translation of Chinese Office Action from corresponding Chinese Patent Application No. 201780045105.0, dated Jan. 5, 2021 (9 pgs.).

* cited by examiner

BATTERY PACK

CROSS-REFERENCE TO RELATED APPLICATION(S)

This application is a National Phase Patent Application and claims priority to and the benefit of International Application Number PCT/KR2017/006672, filed on Jun. 23, 2017, which claims priority to Korean Patent Application Number 10-2016-0092904, filed on Jul. 21, 2016, the entire contents of all of which are incorporated herein by reference.

TECHNICAL FIELD

The present disclosure relates to a battery pack, and more particularly, to a battery pack capable of improving operational convenience.

BACKGROUND ART

In general, battery cells are used as energy sources for mobile devices, electric vehicles, hybrid vehicles, or other electric devices, and such battery cells are variously modified according to the types of devices to which the battery cells are applied.

Small mobile devices such as cellular phones may be operated for a certain period of time by using the power and capacity of a single battery cell. However, high-capacity battery packs each formed by electrically connecting a plurality of battery cells to increase power and capacity are used for devices such as electric vehicles or hybrid vehicles consuming large amounts of power, having long operating times, and requiring high-power driving.

In this case, the plurality of battery cells are electrically connected to each other through connection tabs. The output voltage or current of the battery packs may be increased by adjusting the number of battery cells included in each battery pack.

DESCRIPTION OF EMBODIMENTS

Technical Problem

An objective of the present disclosure is to provide a battery pack in which a protective circuit module may be electrically connected to battery cells without additional soldering by inserting latching portions of second lead tabs connected to the battery cells into holes of first lead tabs connected to the protective circuit module.

Solution to Problem

Embodiments of the present disclosure provide battery packs.

According to an aspect of the present disclosure, a battery pack includes: a plurality of battery cells arranged parallel to each other in a length direction thereof, each of the battery cells including an electrode portion on each end thereof; a holder case accommodating the plurality of battery cells; a protective circuit module mounted on an outer side of the holder case; at least one first lead tab including a fixing portion and a fastening portion, the fixing portion extending from a region of the protective circuit module facing the holder case toward the holder case, the fastening portion being bent from the fixing portion in a direction parallel to the holder case and extending toward the electrode portion of the battery cell; and a second lead tab electrically connected to the electrode portion of the battery cell and placed at a position corresponding to the fastening portion of the first lead tab of the protective circuit module, wherein a fastening hole is formed in one of the first and second lead tabs and a latching portion is formed in the other of the first and second lead tabs such that the protective circuit module and the battery cell are electrically connected to each other by fastening the latching portion to the fastening hole.

Advantageous Effects of Disclosure

According to the present disclosure, a protective circuit module and a battery cell may be electrically connected to each other without additional soldering by inserting a latching portion of the battery cell into a hole of the protective circuit module, and thus repair may be easily performed.

BEST MODE

Figure 1:
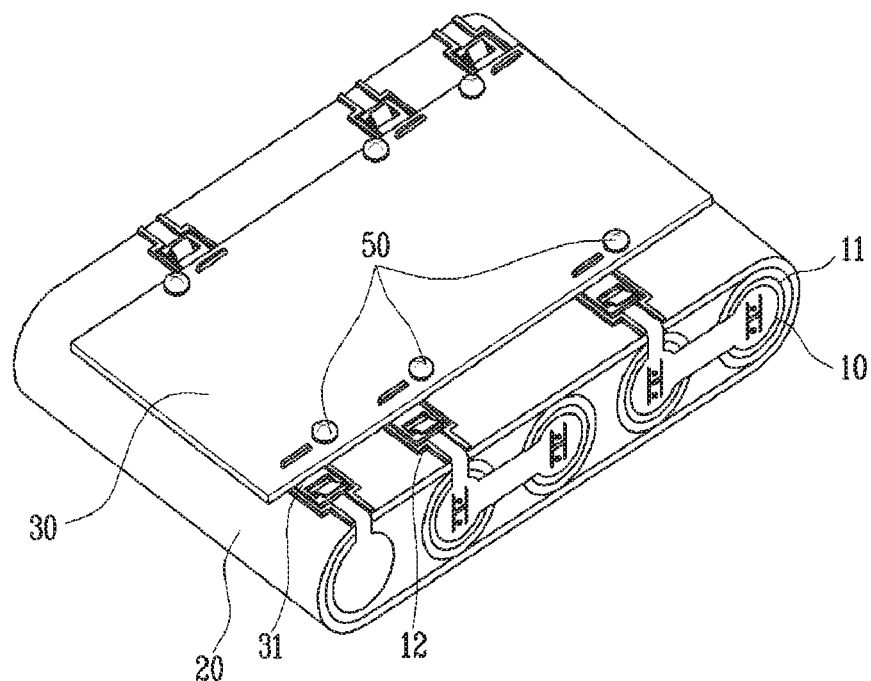
FIG. 1 is a perspective view illustrating a battery pack according to the present disclosure.

A battery pack of the present disclosure includes: a plurality of battery cells arranged parallel to each other in a length direction thereof, each of the battery cells including an electrode portion on each end thereof; a holder case accommodating the plurality of battery cells; a protective circuit module mounted on an outer side of the holder case; at least one first lead tab including a fixing portion and a fastening portion, the fixing portion extending from a region of the protective circuit module facing the holder case toward the holder case, the fastening portion being bent from the fixing portion in a direction parallel to the holder case and extending toward the electrode portion of the battery cell; and a second lead tab electrically connected to the electrode portion of the battery cell and placed at a position corresponding to the fastening portion of the first lead tab of the protective circuit module, wherein a fastening hole is formed in one of the first and second lead tabs and a latching portion is formed in the other of the first and second lead tabs such that the protective circuit module and the battery cell are electrically connected to each other by fastening the latching portion to the fastening hole.

Here, the fastening hole is formed in the first lead tab, and the latching portion is formed in the second lead tab.

In addition, the latching portion has a hook shape.

In addition, the second lead tab includes a body portion connected to the electrode portion, an extension portion extending from the body portion, a first bent portion being bent from the extension portion toward an outer surface of the holder case, a rest portion extending from the first bent portion and resting on the outer surface of the holder case, a second bent portion being bent from the rest portion in a direction opposite the first bent portion, and the latching portion extending from the second bent portion and located in a region above the rest portion.

In addition, the holder case includes a guide portion protruding upward along edges of the first and second lead tabs except a region in which the first bent portion is placed, to accommodate the first and second lead tabs.

In addition, a rib having an inclined side is provided on the holder case, and a rib insertion hole is formed in the first lead tab corresponding to the rib.

In addition, the rib insertion hole is formed from a region of the fixing portion of the first lead tab to the fastening portion of the first lead tab.

In addition, a penetration hole is formed in a region of the protective circuit module, and a fastening recess is formed in the holder case corresponding to the penetration hole such that a fastening member is inserted into the penetration hole and the fastening recess.

Mode of Disclosure

Hereinafter, embodiments of the present disclosure and other matters necessary for those of ordinary skill in the art to easily understand the idea of the present disclosure will be described in detail with reference to the accompanying drawings. However, the idea of the present disclosure may be implemented in different forms within the scope of the claims, and the embodiments described below are merely examples regardless of expressions used to describe the embodiments.

In the following description, detailed descriptions of well-known functions or configurations related to the present disclosure will not be presented if it is determined that the descriptions unnecessarily obscure subject matters of the present disclosure. When allocating reference numerals to elements in the drawings, like elements are denoted, if possible, with like reference numerals even though the elements are illustrated in different drawings. In the drawings, the thickness or size of each element may be exaggerated for ease and clarity in illustration and may thus be different from their actual thickness and size.

Figure 2A:
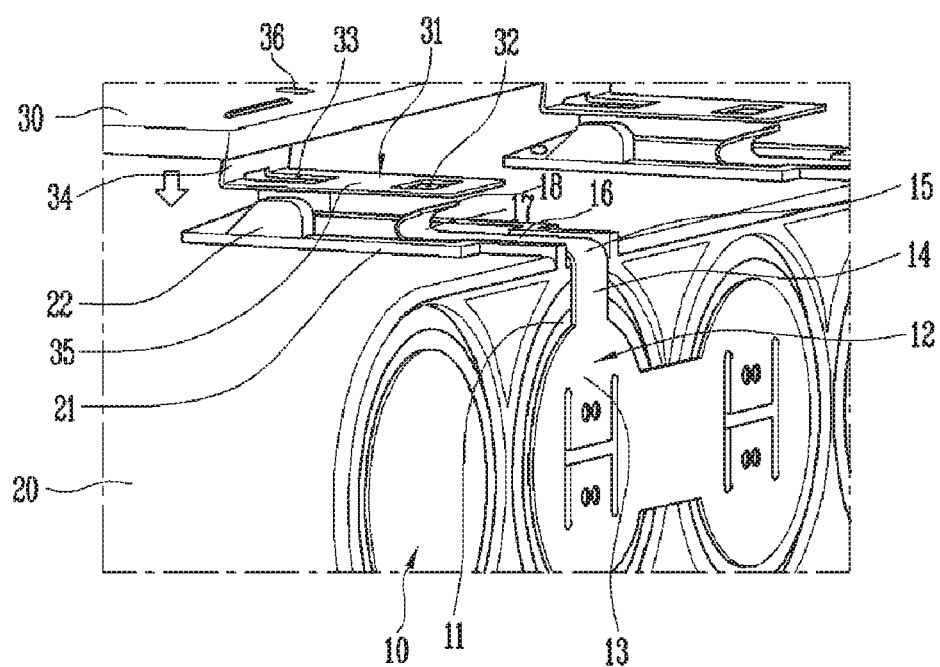
FIG. 2A is a perspective view illustrating a state in which a first lead tab of a protective circuit module is not yet connected to a second lead tab of a battery cell.
Figure 2B:
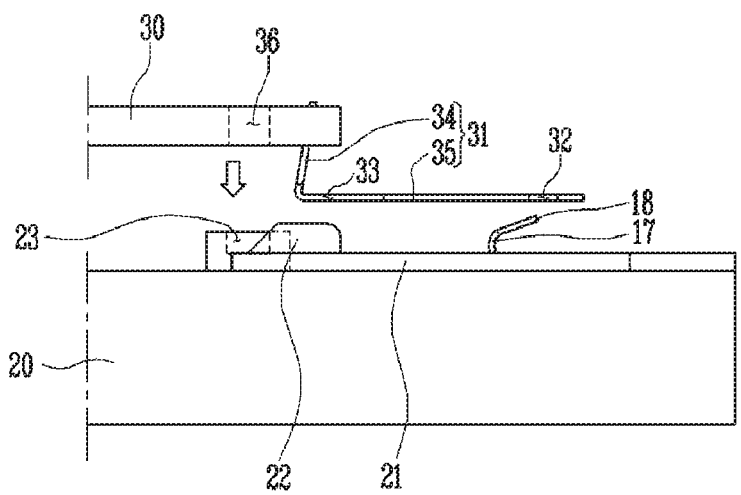
FIG. 2B is a cross-sectional view taken along line A-A in FIG. 2A.

FIG. 1 is a perspective view illustrating a battery pack of the present disclosure, FIG. 2A is a perspective view illustrating a state in which a first lead tab of a protective circuit module is not yet connected to a second lead tab of a battery cell, and FIG. 2B is a cross-sectional view taken along line A-A in FIG. 2A.

Referring to FIGS. 1 to 2B, the battery pack according to the present disclosure includes a plurality of battery cells 10, a holder case 20 accommodating the plurality of battery cells 10, and a protective circuit module 30 mounted on an outer side of the holder case 20. In addition, the battery pack further includes a first lead tab 31 extending from the protective circuit module 30 and a second lead tab 12 electrically connecting a plurality of battery cells to each other. In this case, a fastening hole 32 may be formed in the first lead tab 31 and a latching portion 18 may be formed on the second lead tab 12 such that the first lead tab 31 and the second lead tab 12 may be fastened to each other by hooking the latching portion 18 to the fastening hole 32. Fastening of the first lead tab 31 and the second lead tab 12 will be described later with reference to FIGS. 2A and 2B.

Hereinafter, each element of the battery pack of the present disclosure will be briefly described.

First, the plurality of battery cells 10 may include electrode portions 11 at both ends thereof and may be arranged parallel to each other in a length direction thereof. In addition, the plurality of battery cells 10 may each be a circular battery cell. However, the present disclosure is not limited thereto. For example, the battery cells 10 may be of various types to which second lead tabs 12 are applicable for series/parallel connection of adjacent battery cells 10. In the present disclosure, five battery cells 10 are arranged parallel to each other in a length direction thereof, and the battery cells 10 may be electrically connected to each other in various ways by using second lead tabs 12 provided on electrode portions 11.

Each of the battery cells 10 may include an electrode assembly therein, and the electrode assembly may include a positive electrode collector, a negative electrode collector, and a separator placed therebetween. In addition, each of the battery cells 10 may include positive and negative electrode terminals connected to the electrode assembly and exposed to the outside. In the present disclosure the positive and negative electrode terminals may correspond to the electrode portions 11.

The plurality of battery cells 10 may be arranged adjacent to each other and may be connected in series or parallel through the second lead tabs 12. In this case, body portions 13 of the second lead tabs 12 and the electrode portions 11 of the battery cells 10 may be electrically connected by welding. Electrode terminals having different polarities may be connected to each other through the second lead tabs 12 for serial connection between adjacent battery cells, or electrode terminals having the same polarity may be connected to each other through the second lead tabs 12 for parallel connection between adjacent battery cells. Here, the second lead tabs 12 may be formed of a conductive element such as copper to electrically connect the five battery cells 10 to each other.

The holder case 20 may enclose lateral surfaces of the plurality of battery cells 10. The holder case 20 may improve the durability of the battery pack against external impact, falling, and vibration.

In addition, the protective circuit module 30 is mounted on an outer surface of the holder case 20, and components such as electronic components may be mounted on the protective circuit module 30 to provide a protective circuit. In this case, the protective circuit module 30 may be screwed to the holder case 20 or fixed to the holder case 20 using other fasteners.

In addition, the protective circuit module 30 may include the first lead tabs 31 for electrical connection with the battery cells 10. Each of the first lead tabs 31 formed on the protective circuit module 30 may include a fixing portion 34 and a fastening portion 35. Here, the fixing portion 34 may extend from a region of the protective circuit module 30 facing the holder case 20 toward the holder case 20. In addition, the fastening portion 35 may be bent from the fixing portion 34 in a direction parallel to the holder case 20 and may extend toward an electrode portion 11 of a battery cell 10. In this case, the angle between the fixing portion 34 and the fastening portion 35 may be less than 90°. That is, the fixing portion 34 may be slightly oblique to the outer surface of the holder case 20.

Sides of the second lead tabs 12 fastened to the first lead tabs 31 of the protective circuit module 30 may electrically connect the electrode portions 11 of the plurality of battery cells 10 to each other, and the other sides of the second lead tabs 12 may be placed at positions correspond to the fastening portions 35 of the first lead tabs 31 of the protective circuit module 30. More specifically, each of the second lead tabs 12 may include a body portion 13, an extension portion 14, a first bent portion 15, a rest portion 16, a second bent portion 17, and the latching portion 18.

First, the body portion 13 may be connected to an electrode portion 11, and the extension portion 14 may extend from the body portion 13. In addition, the first bent portion 15 may be bent from the extension portion 14 toward the outer surface of the holder case 20, and the rest portion 16 may extend from the first bent portion 15 and may rest on the outer side of the holder case 20. In addition, the second bent portion 17 may be bent from the rest portion 16 in a direction opposite the first bent portion 15, and the latching portion 18 may extend from the second bent portion 17 and may be placed in a region above the rest portion 16.

In the present disclosure, the fastening hole 32 is formed in a region of the fastening portion 35 of the first lead tab 31, and the latching portion 18 is formed on the second lead tab 12. Therefore, the protective circuit module 30 and each of the battery cells 10 may be electrically connected to each other by fastening the latching portion 18 to the fastening hole 32. In this case, the latching portion 18 may have a hook shape.

Here, the fastening hole 32 is formed in the first lead tab 31; the fastening portion 18 is formed on the second lead tab 12; and the fastening hole 32 and the latching portion 18 are fastened to each other. However, the latching portion 18 may be formed on the first lead tab 31, and the fastening hole 32 may be formed in the second lead tab 12 to accommodate the latching portion 18.

As described above, according to the present disclosure, the first lead tab 31 extending from the protective circuit module 30 includes the fastening hole 32, and the latching portion 18 is formed on an end portion of the second lead tab 12 connected to the battery cell 10 such that coupling may be possible without welding.

The holder case 20 may further include a guide portion 21 protruding upward along edges of the first lead tab 31 and the second lead tab 12 except a region in which the first bent portion 15 is placed. In this case, since the first lead tab 31 and the second lead tab 12 are accommodated in an inner side of the guide portion 21, the first lead tab 31 and the second lead tab 12 may rest in place on the outer side of the holder case 20.

In addition, a rib 22 having an inclined side may be formed on the holder case 20 at a position corresponding to the first lead tab 31 connected to the protective circuit module 30. A rib insertion hole 33 corresponding to the rib 22 may be formed in the first lead tab 31.

Here, the rib insertion hole 33 may extend from a region of the fixing portion 34 of the first lead tab 31 to a region of the fastening portion 35 of the first lead tab 31. The latching portion 18 being an end portion of the second lead tab 12 is fastened to the fastening hole 32 of the first lead tab 31, and along with this, the rib 22 may be inserted into the rib insertion hole 33 of the first lead tab 31. At this time, since a region of the rib 22 positioned on a side of the fixing portion 34 of the first lead tab 31 is inclined, the rib 22 may be easily inserted into the rib insertion hole 33.

Voltage between battery cells of a general battery pack may be measured by connecting monitoring wires or tabs. For this purpose, monitoring wires may have to be connected to a protective circuit module by performing soldering on the monitoring wires or tabs. This connection structure is complex, and thus may increase battery pack defects. However, according to the present disclosure, monitoring wires are not used, and thus defects caused by the used of soldering or monitoring wires may markedly decrease.

In the present disclosure, the holder case 20 may expose the electrode portions 11 of the plurality of battery cells 10. The holder case 20 may improve the durability of the battery pack against external impact, falling, and vibration.

Referring to FIGS. 2A and 2B, the first lead tab 31 may be formed on a lower surface of the protective circuit module 30 facing the holder case 20. In addition, an end of the second lead tab 12 electrically connecting a plurality of battery cells 10 to each other may be welded to the electrode portions 11 of the plurality of battery cells 10, and the other end of the second lead tab 12 may extend and bent toward an upper surface of the holder case 20.

Here, the second lead tab 12 may be positioned below the first lead tab 31; the latching portion 18 having a hook shape may be formed on an end portion of the second lead tab 12; and the fastening hole 32 may be formed in the first lead tab 31 corresponding to the latching portion 18.

In addition, the first lead tab 31 may include: the fixing portion 34 extending from the lower surface of the protective circuit module 30 toward the upper surface of the holder case 20; and the fastening portion 35 extending from the fixing portion 34 in a direction parallel to the upper surface of the holder case 20. The rib insertion hole 33 may be formed from a region of the fixing portion 34 to a region of the fastening portion 35, and the rib 22 may be formed on the holder case 20 corresponding to the rib insertion hole 33.

Figure 3A:
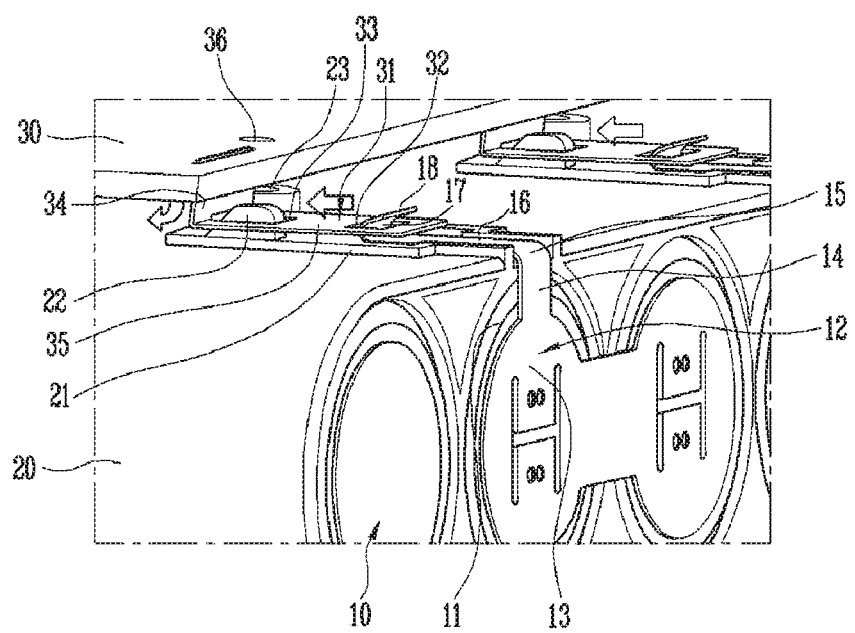
FIG. 3A is a perspective view illustrating a state in which a latching portion of the second lead tab connected to the battery cell is inserted into a fastening hole of the first lead tab connected to the protective circuit module.
Figure 3B:
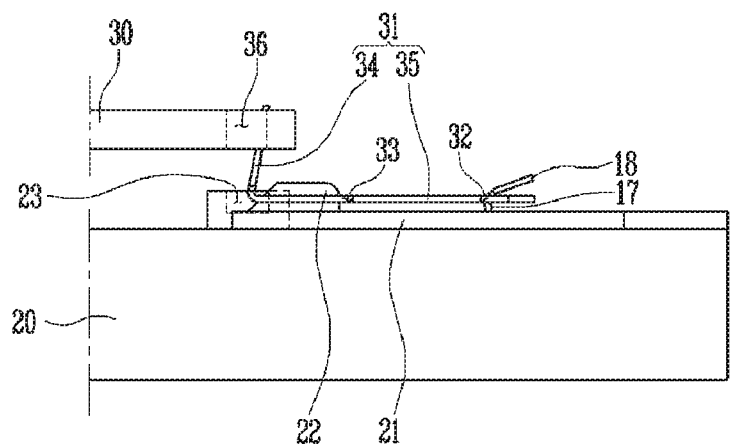
FIG. 3B is a cross-sectional view taken along line B-B' in FIG. 3A.

FIG. 3A is a perspective view illustrating a state in which the latching portion of the second lead tab connected to the battery cell is inserted into the fastening hole of the first lead tab connected to the protective circuit module; FIG. 3B is a cross-sectional view taken along line B-B' in FIG. 3A; and FIG. 3C is a top perspective view of the state shown in FIG. 3A.

Figure 3C:
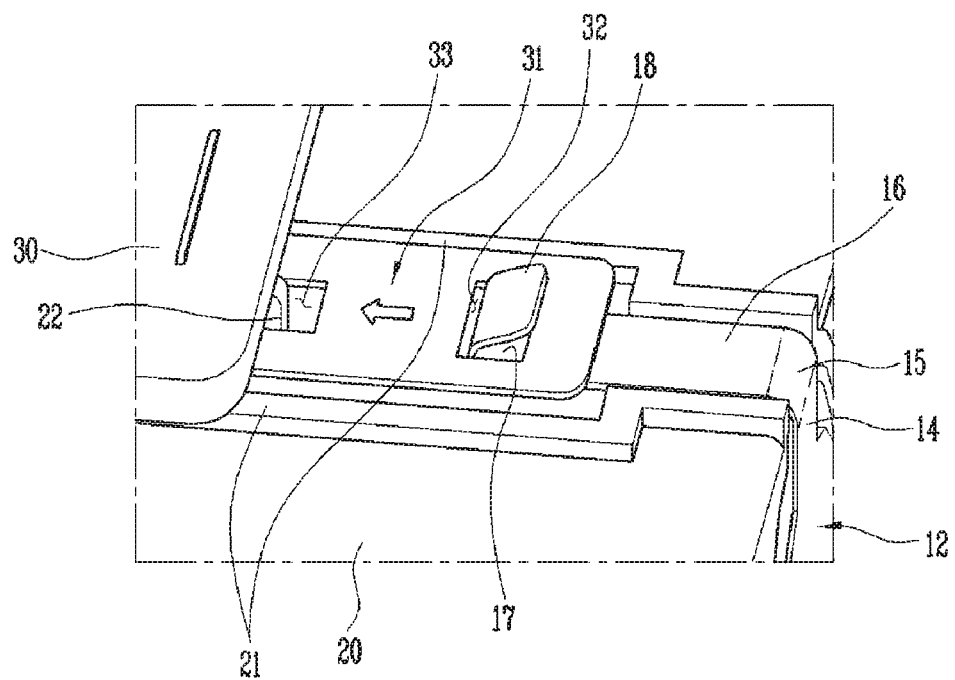
FIG. 3C is a top perspective view illustrating the state shown in FIG. 3A.

Referring to FIGS. 3A to 3C, in the above-described structure, the latching portion 18 may be fastened to the fastening hole 32, and along with this, the rib 22 may be inserted into the rib insertion hole 33. At this time, since a side of the rib 22 which is in contact with the fixing portion 34 of the first lead tab 31 is inclined, the rib 22 may be more easily inserted into the rib insertion hole 33.

Here, the first lead tab 31 connected to the protective circuit module 30 has an inclined portion as the angle between the fixing portion 34 and the coupling portion 35 is about 80°, and thus the rib 22 of the holder case 20 may have a side inclined at an angle of about 40°. Owing to this, when the protective circuit module 30 is pressed from above to mount the protective circuit module 30 on the outer surface of the holder case 20, the first lead tab 31 is pushed toward the inclined side of the rib 22 because of the difference between the angle of the first lead tab 31 and the angle of the rib 22. Therefore, the first lead tab 31 and the second lead tab 12 may be locked while maintaining tension.

Figure 4A:
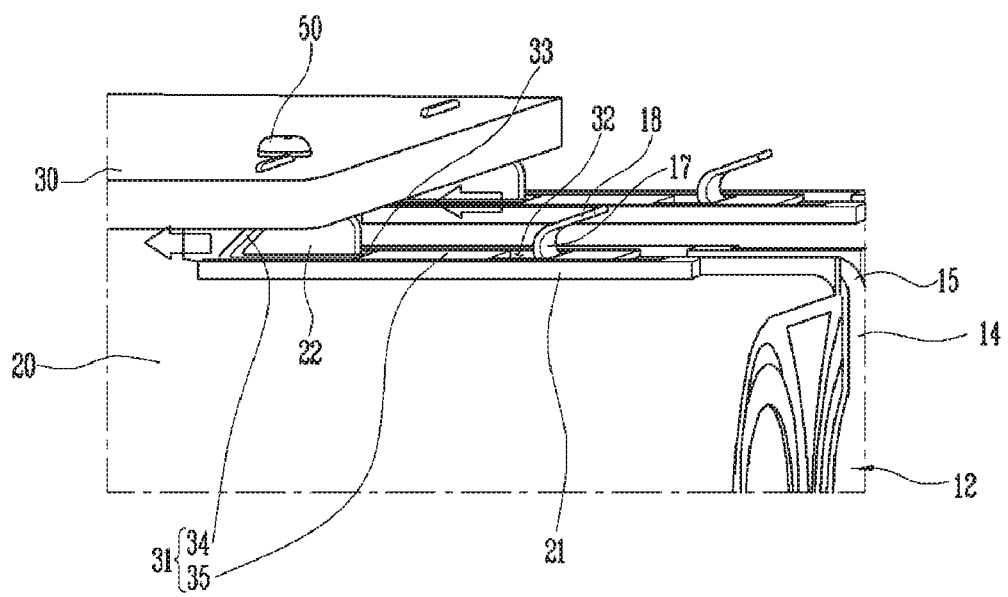
FIG. 4A is a perspective view illustrating a state in which the first lead tab connected to the protective circuit module and the second lead tab connected to the battery cell are fastened to each other.
Figure 4B:
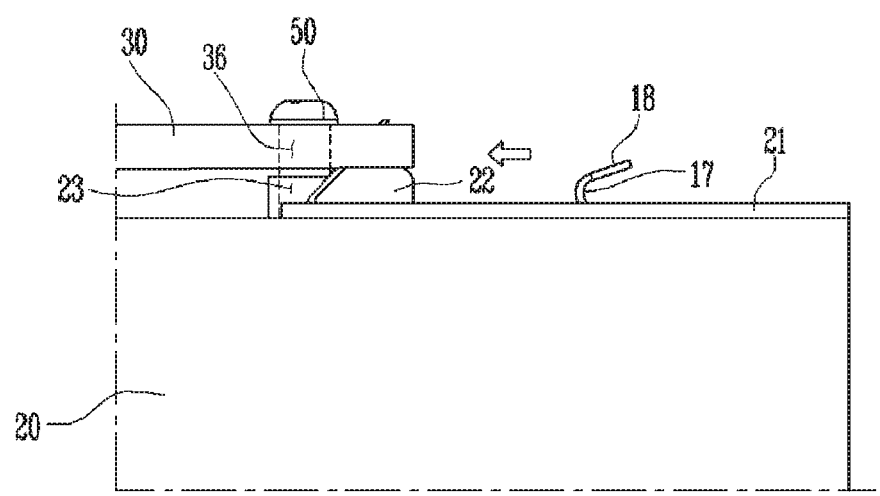
FIG. 4B is a cross-sectional view taken along line C-c' in FIG. 4A.

FIG. 4A is a perspective view illustrating a state in which the first lead tab connected to the protective circuit module and the second lead tab connected to the battery cell are fastened to each other; FIG. 4B is a cross-sectional view taken along line C-C' in FIG. 4A; and FIG. 4C is a top perspective view of the state shown in FIG. 4A.

Figure 4C:
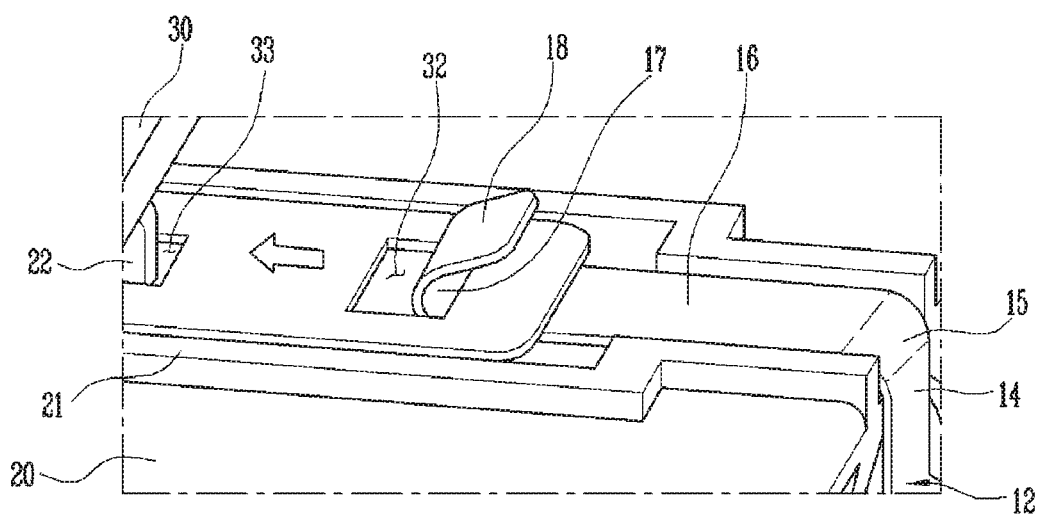
FIG. 4C is a top perspective view illustrating the state shown in FIG. 4A.

Referring to FIGS. 4A to 4C, to fix the protective circuit module 30 to the holder case 20, a penetration hole 36 may be formed in a region of the protective circuit module 30, and a fastening recess 23 corresponding to the penetration hole 36 may be formed in the holder case 20. In addition, the protective circuit module 30 may be more firmly fastened to the holder case 20 by inserting a fastening member 50 through the penetration hole 36 and into the fastening recess 23, and fastening the fastening member 50 to the fastening recess 23.

When the protective circuit module 30 is pressed from above to fasten the first lead tab 31 and the second lead tab 12 to each other, the direction of pressing force may be changed from vertical to horizontal because of the angle between the fixing portion 34 and the fastening portion 35 of the first lead tab 31 connected to the protective circuit module 30 and the angle of the inclined side of the rib 22 formed on the holder case 20. That is, as the direction of force applied to an upper portion of the protective circuit module 30 is changed to a lateral direction by the inclined side of the rib 22, latching may occur between the first lead tab 31 and the second lead tab 12.

In this manner, at the same time when the protective circuit module 30 is mounted on the holder case 20, the first lead tab 31 of the protective circuit module 30 may be locked to the second lead tab 12 of the battery cell 10. In this manner, the protective circuit module 30 and the plurality of battery cells 10 may be electrically connected to each other without soldering, and thus repair may be more easily performed.

While technical ideas of the present disclosure have been specifically described with reference to preferred embodiments, the embodiments are for illustrative purposes one and not for purposes of limitation. In addition, it will be understood by those of ordinary skill in the art that various modifications may be made within the scope of the present disclosure.

The scope of the present disclosure is defined by the following claims and is not to be construed as being limited to the description of the specification, and all variations and modifications falling within the scope of the claims and equivalents thereof are included in the scope of the present disclosure.

INDUSTRIAL APPLICABILITY

An embodiment of the present disclosure provides a battery pack capable of improving operational convenience, and the battery pack may be used as an energy source for a mobile device, an electric vehicle, a hybrid vehicle, or other electric devices. The battery pack may be various modified according to the types of devices to which the battery pack is applied.

The invention claimed is:

1. A battery pack comprising:
 a plurality of battery cells arranged parallel to each other in a length direction thereof, each of the battery cells comprising an electrode portion on each end thereof;
 a holder case accommodating the plurality of battery cells;
 a protective circuit module mounted on an outer side of the holder case;
 at least one first lead tab comprising a fixing portion and a fastening portion, the fixing portion extending from a region of the protective circuit module facing the holder case toward the holder case, the fastening portion being bent from the fixing portion in a direction parallel to the holder case and extending toward the electrode portion of the battery cell; and
 a second lead tab electrically connected to the electrode portion of the battery cell and placed at a position corresponding to the fastening portion of the first lead tab,
 wherein a fastening hole is formed in one of the first and second lead tabs and a latching portion is formed in the other of the first and second lead tabs such that the protective circuit module and the battery cell are electrically connected to each other by fastening the latching portion to the fastening hole.

2. The battery pack of claim 1, wherein the fastening hole is formed in the first lead tab, and the latching portion is formed in the second lead tab.

3. The battery pack of claim 1, wherein the latching portion has a hook shape.

4. The battery pack of claim 1, wherein the second lead tab comprises a body portion connected to the electrode portion, an extension portion extending from the body portion, a first bent portion being bent from the extension portion toward an outer surface of the holder case, a rest portion extending from the first bent portion and resting on the outer surface of the holder case, a second bent portion being bent from the rest portion in a direction opposite the first bent portion, and the latching portion extending from the second bent portion and located in a region above the rest portion.

5. The battery pack of claim 4, wherein the holder case comprises a guide portion protruding upward along edges of the first and second lead tabs except a region in which the first bent portion is placed, to accommodate the first and second lead tabs.

6. The battery pack of claim 1, wherein a rib having an inclined side is provided on the holder case, and a rib insertion hole is formed in the first lead tab corresponding to the rib.

7. The battery pack of claim 6, wherein the rib insertion hole is formed from a region of the fixing portion of the first lead tab to the fastening portion of the first lead tab.

8. The battery pack of claim 1, wherein a penetration hole is formed in a region of the protective circuit module, and a fastening recess is formed in the holder case corresponding to the penetration hole such that a fastening member is inserted into the penetration hole and the fastening recess.

* * * * *